United States Patent
Sawamura et al.

(10) Patent No.: US 9,737,816 B2
(45) Date of Patent: *Aug. 22, 2017

(54) RANKING LIST DISPLAY METHOD IN GAME SYSTEM, AND SYSTEM FOR EXECUTING THE METHOD

(71) Applicant: GREE, Inc., Minato-ku (JP)

(72) Inventors: Maya Sawamura, Tokyo (JP); Takuya Kai, Tokyo (JP); Kenji Iguchi, Tokyo (JP); Yushi Takagi, Tokyo (JP); Toshiharu Yabe, Tokyo (JP)

(73) Assignee: GREE, Inc., Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/386,971

(22) Filed: Dec. 21, 2016

(65) Prior Publication Data

US 2017/0100673 A1    Apr. 13, 2017

Related U.S. Application Data

(63) Continuation of application No. 14/174,291, filed on Feb. 6, 2014, now Pat. No. 9,561,434.

(51) Int. Cl.
*A63F 13/798* (2014.01)
*A63F 13/537* (2014.01)

(52) U.S. Cl.
CPC .......... *A63F 13/798* (2014.09); *A63F 13/537* (2014.09)

(58) Field of Classification Search
CPC .. A63F 13/214; A63F 13/537; A63F 13/5375; A63F 13/798; A63F 13/92; A63D 5/04; A63B 71/06; A63B 71/0669
See application file for complete search history.

(56) References Cited

U.S. PATENT DOCUMENTS 5,337,405 A    8/1994  Lindauer
6,174,236 B1   1/2001  Tsuda
(Continued)

FOREIGN PATENT DOCUMENTS

JP    6-186059 A    7/1994
JP    9-325879 A    12/1997
(Continued)

OTHER PUBLICATIONS

Japanese Office Action issued Mar. 25, 2014 in Patent Application No. 2013-031903 with English Translation.
Office Action issued Oct. 21, 2014 in Japanese Patent Application No. 2013-031903 (with English language translation).
Japanese Office Action issued Aug. 25, 2015 in Japanese Patent Application No. 2013-031903 (with English translation).

*Primary Examiner* — Milap Shah
(74) *Attorney, Agent, or Firm* — Oblon, McClelland, Maier & Neustadt, L.L.P.

(57) ABSTRACT

A ranking list display method in a game system, which can easily execute ranking confirmation of a user, who is a ranking confirmation target, such as the user himself/herself, a friend or a rival, is provided. The ranking list display method in a game system includes determining a position in a ranking list of a game of a user who is a ranking confirmation target in relation to a display range of the ranking list which is currently displayed on a terminal, and displaying a pointer, which corresponds to the determined position in the ranking list of the user who is the ranking confirmation target in relation to the display range of the ranking list which is currently displayed on the terminal, within the display range of the ranking list which is currently displayed on the terminal.

8 Claims, 15 Drawing Sheets

(56) References Cited

U.S. PATENT DOCUMENTS

| | | | |
|---|---|---|---|
| 6,285,366 B1 | 9/2001 | Ng | |
| 6,839,435 B1 | 1/2005 | Iijima | |
| 8,375,334 B2 * | 2/2013 | Nakano | G06F 1/1626 |
| | | | 715/810 |
| 8,845,437 B2 * | 9/2014 | Lim | A63F 13/795 |
| | | | 463/31 |
| 9,299,064 B1 | 3/2016 | Liu | |
| 9,561,434 B2 * | 2/2017 | Sawamura | A63F 13/12 |
| 2003/0093168 A1 | 5/2003 | Nagaoka | |
| 2004/0100479 A1 | 5/2004 | Nakano | |
| 2007/0173321 A1 | 7/2007 | Shen | |
| 2011/0099490 A1 | 4/2011 | Barraclough | |
| 2011/0250965 A1 | 10/2011 | Kulas | |
| 2011/0250969 A1 | 10/2011 | Os | |
| 2011/0296004 A1 | 12/2011 | Swahar | |
| 2012/0322561 A1 | 12/2012 | Kohlhoff | |
| 2013/0013094 A1 | 1/2013 | Parks | |
| 2013/0288788 A1 | 10/2013 | Lim | |
| 2014/0173504 A1 | 6/2014 | Gup | |
| 2015/0242434 A1 | 8/2015 | Wollenstein | |

FOREIGN PATENT DOCUMENTS

| | | |
|---|---|---|
| JP | 2002-526824 A | 8/2002 |
| JP | 2008-12221 | 1/2008 |
| JP | 2012-213492 | 11/2012 |

\* cited by examiner

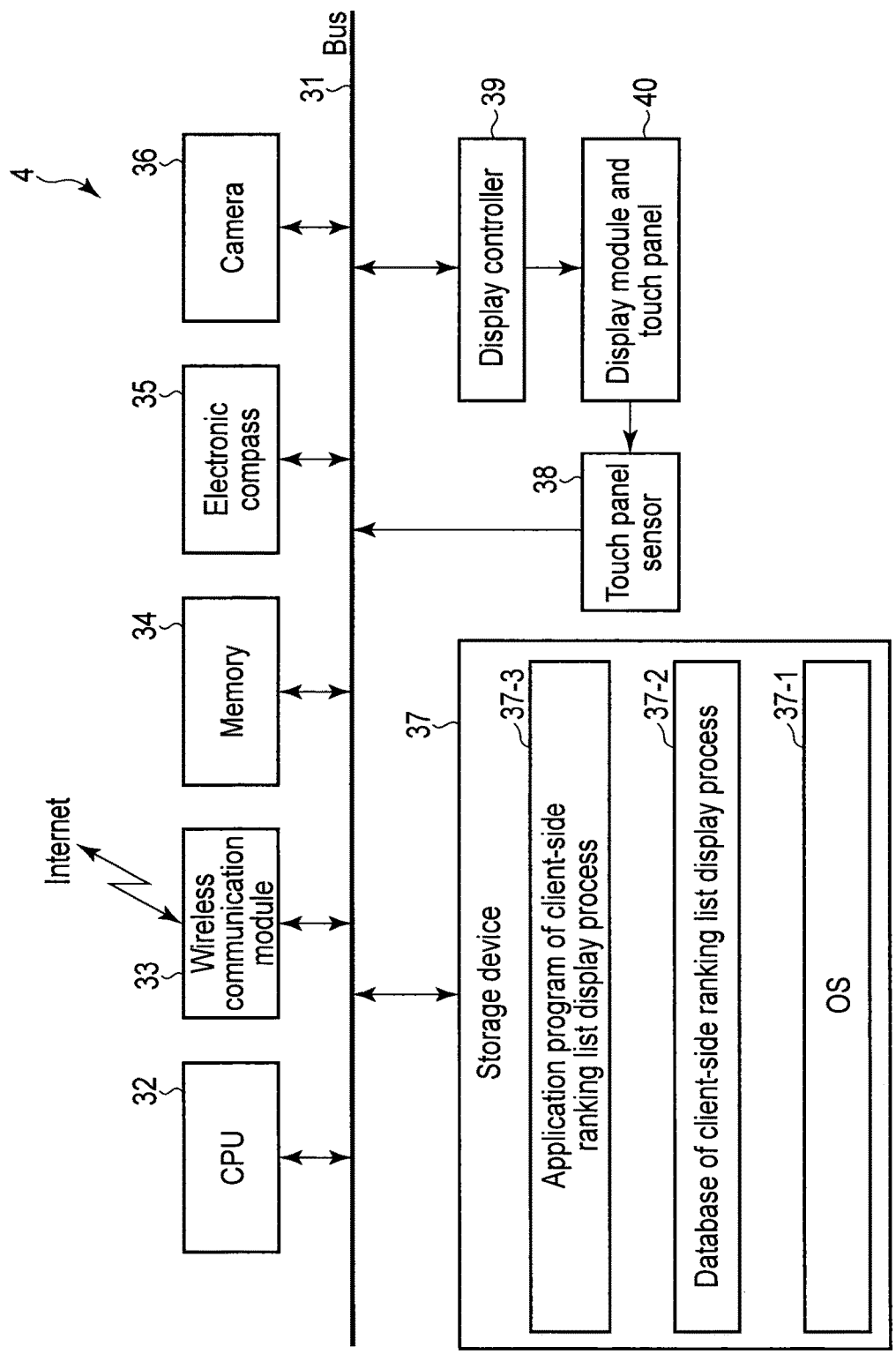
F I G. 4

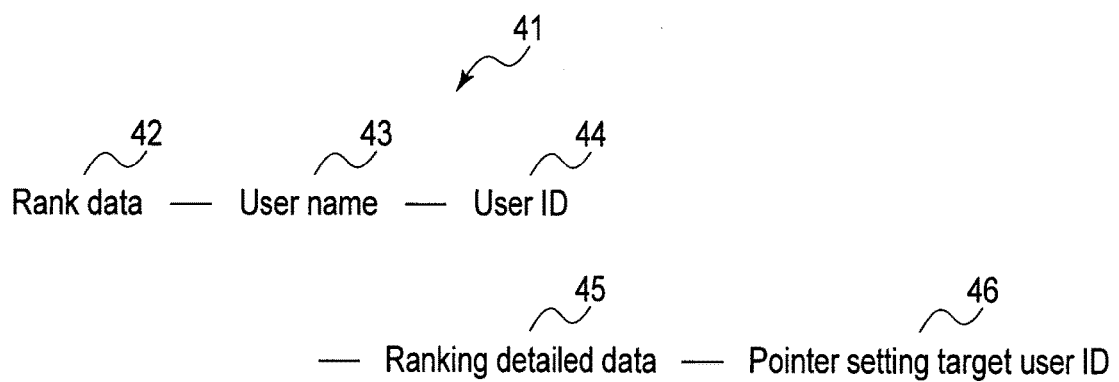
F I G. 5

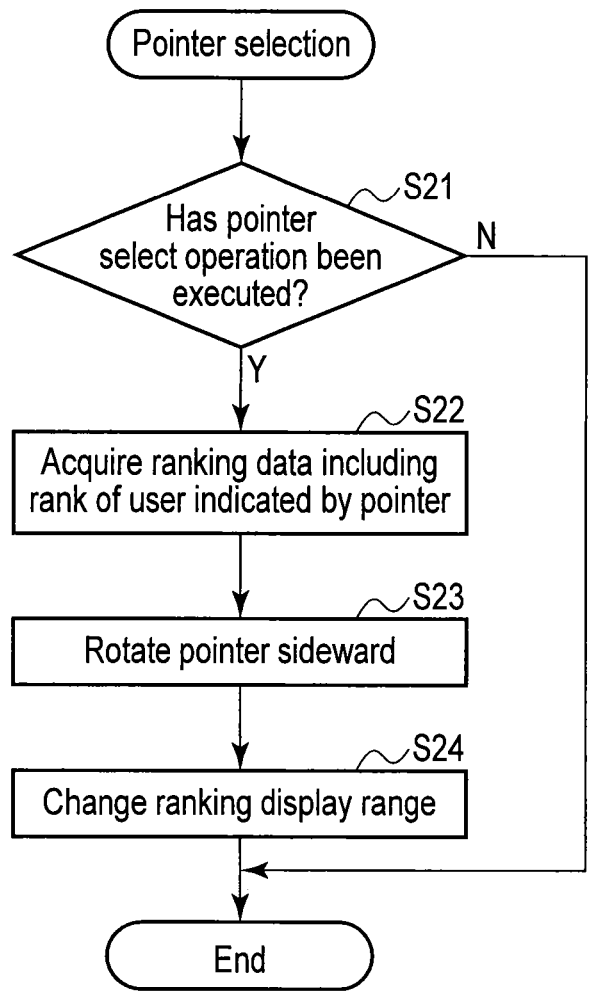
F I G. 10

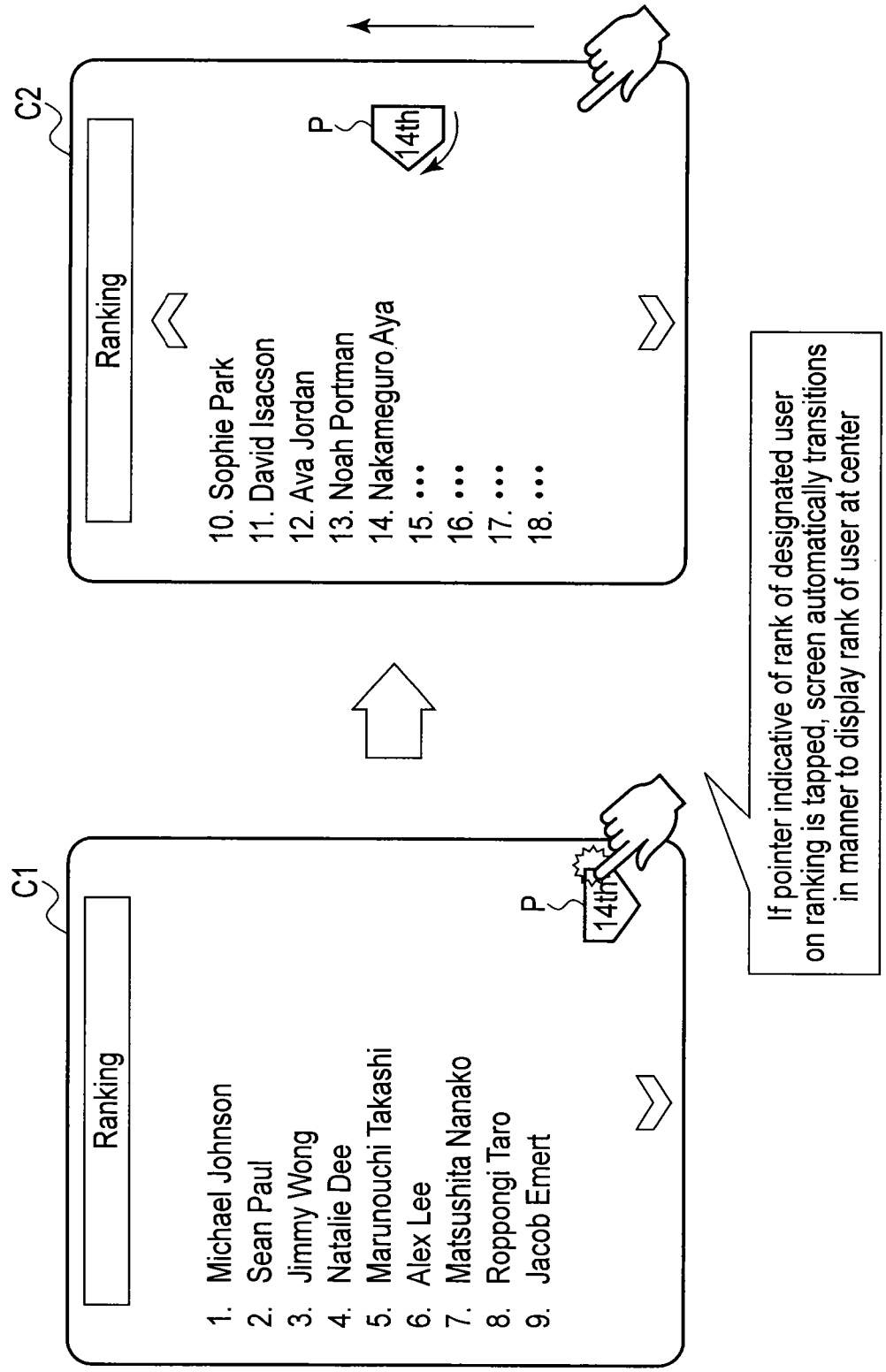
F I G. 11

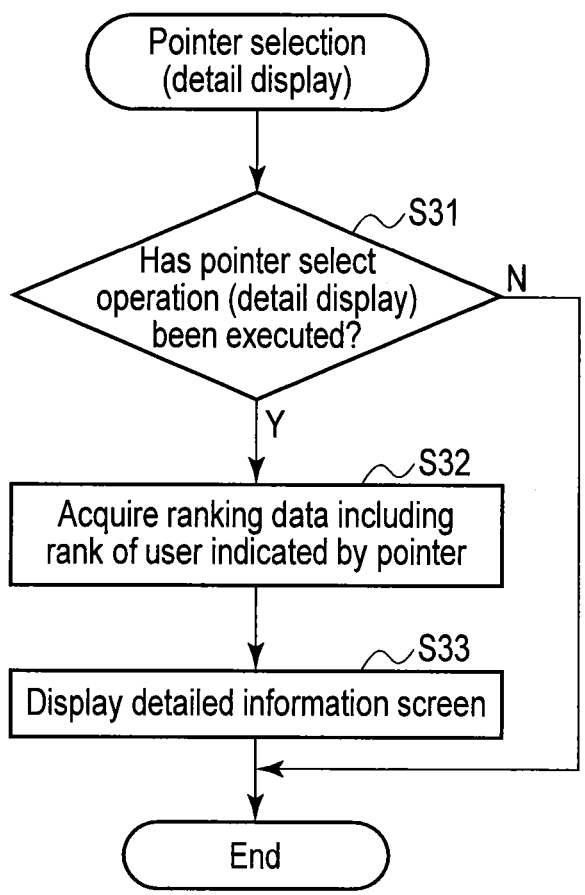
F I G. 12

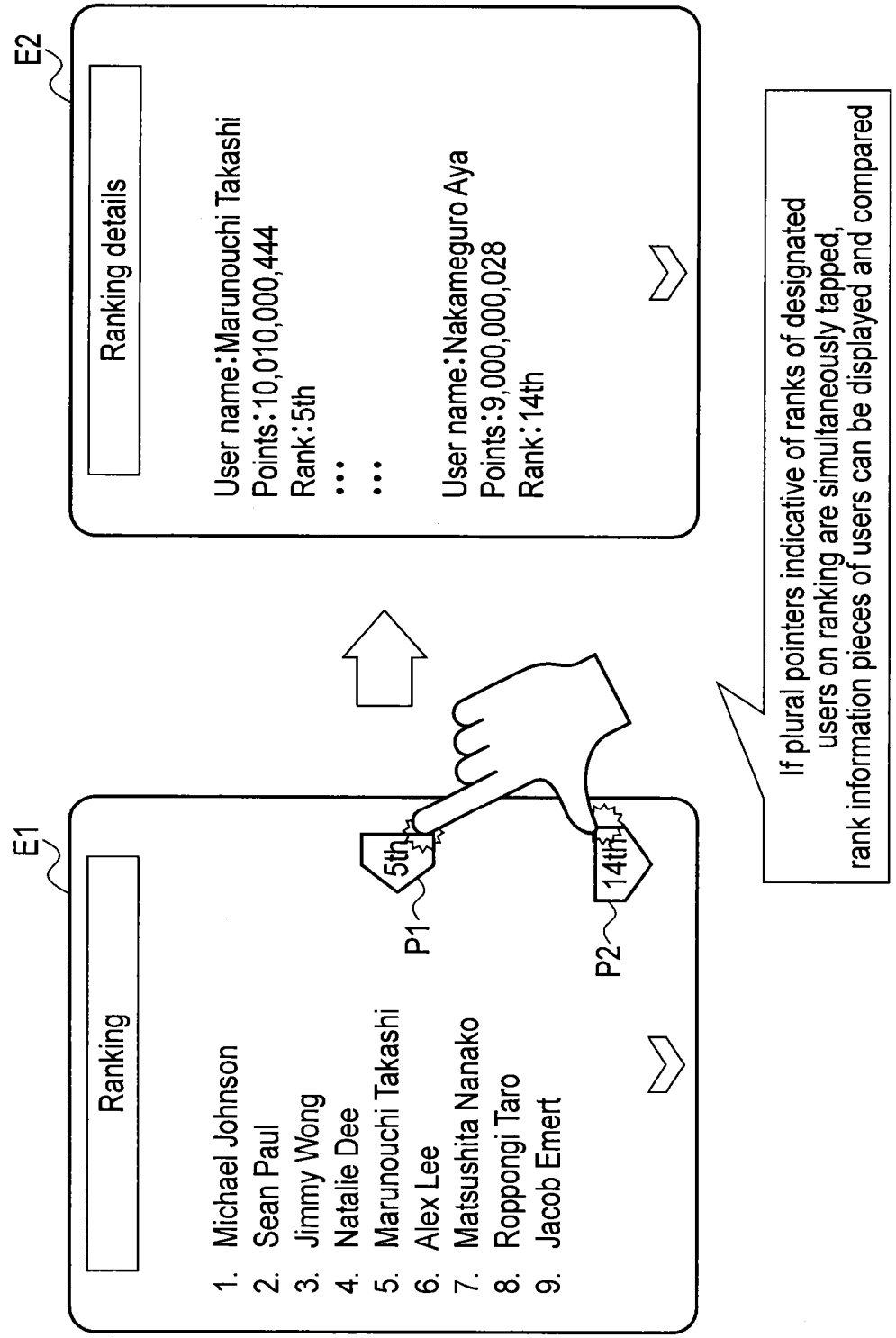
F I G. 15

RANKING LIST DISPLAY METHOD IN GAME SYSTEM, AND SYSTEM FOR EXECUTING THE METHOD

CROSS-REFERENCE TO RELATED APPLICATIONS

This application is a continuation application which claims the benefit of priority under 35 U.S.C. §120 of U.S. application Ser. No. 14/174,291, filed Feb. 6, 2014 and is based upon and claims the benefit of priority from Japanese Patent Application No. 2013-031903, filed on Feb. 21, 2013, the entire contents of which are incorporated herein by reference.

BACKGROUND OF THE INVENTION

1. Field of the Invention

The present invention relates to a ranking list display method in a game system, and a system for executing the method.

2. Description of the Related Art

With the development of mobile phones and network technologies, it is widely practiced to collect ranking information of games of players on a server side, and to display the ranking information on a client side (Patent document 1).

In particular, in recent years, with recent popularity of social networking services (SNS), the number of users of games using the SNS reaches several millions in some cases. This being the case, the Quantity of ranking information is enormous, the work of a user for confirming the ranking of the user himself/herself, a rival or a friend is time-consuming.

As a method for solving this problem, there is known a technique of acquiring ranking information in proximity to the game score of the user himself/herself (i.e. ranking information which meets a condition of proximity), and visually displaying a relative difference between this user and other users in accordance with game scores (Patent document 2).

CITATION LIST

Patent Literature

Patent document 1: Jpn. Pat. Appln. KOKAI Publication No. 2008-12221
Patent document 2: Jpn. Pat. Appln. KOKAI Publication No. 2012-213492

BRIEF SUMMARY OF THE INVENTION

However, even in the technique of visually displaying a relative difference between the user and other users in accordance with game scores, in the above-described game using the SNS, there are not only the user himself/herself, but also friends relating to the user, and rivals whom the user cares about, and the work of confirming the rankings of these persons is time-consuming. If the work of confirming the rankings becomes time-consuming, such a problem arises that the ratio of withdrawal of users of the game itself increases.

The present invention has been made in consideration of the above circumstances, and the object of the invention is to provide a ranking list display method in a game system, which can easily execute ranking confirmation of a user, who is a ranking confirmation target, such as the user himself/herself, a friend or a rival, and a system for executing this method.

According to a first invention of the present invention, a ranking list display method in a game system includes determining a position in a ranking list of a game of a user who is a ranking confirmation target in relation to a display range of the ranking list which is currently displayed on a terminal; and displaying a pointer, which corresponds to the determined position in the ranking list of the user who is the ranking confirmation target in relation to the display range of the ranking list which is currently displayed on the terminal, within the display range of the ranking list which is currently displayed on the terminal.

According to the present invention, it is possible to easily execute ranking confirmation of a user, who is a ranking confirmation target, such as the user himself/herself, a friend or a rival.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a view illustrating the configuration of a mobile phone (smartphone) 4 (4-1, 4-2) in the embodiment of the invention.

FIG. 5 is a view illustrating ranking data which is stored in a database 23 of a server-side ranking list display process program 22.

FIG. 10 is a flowchart for describing a transition of a screen in a case where a pointer displayed on the screen has been tapped.

FIG. 11 is a view illustrating a case in which, when a pointer P of a 14th rank displayed on a screen C1 has been tapped, the screen C1 transitions to a screen C2 which displays the 14th rank of the setup target user at the center.

FIG. 12 is a flowchart for describing a method of referring to detailed information from a pointer indicative of the setup target user on the ranking.

FIG. 15 is a view illustrating a detail display screen which is displayed when a multiple pointer select operation (detail display) has been executed.

DETAILED DESCRIPTION OF THE INVENTION

Referring to the accompanying drawings, a ranking list display method in a game system according to an embodiment of the invention will now be described.

Figure 1:
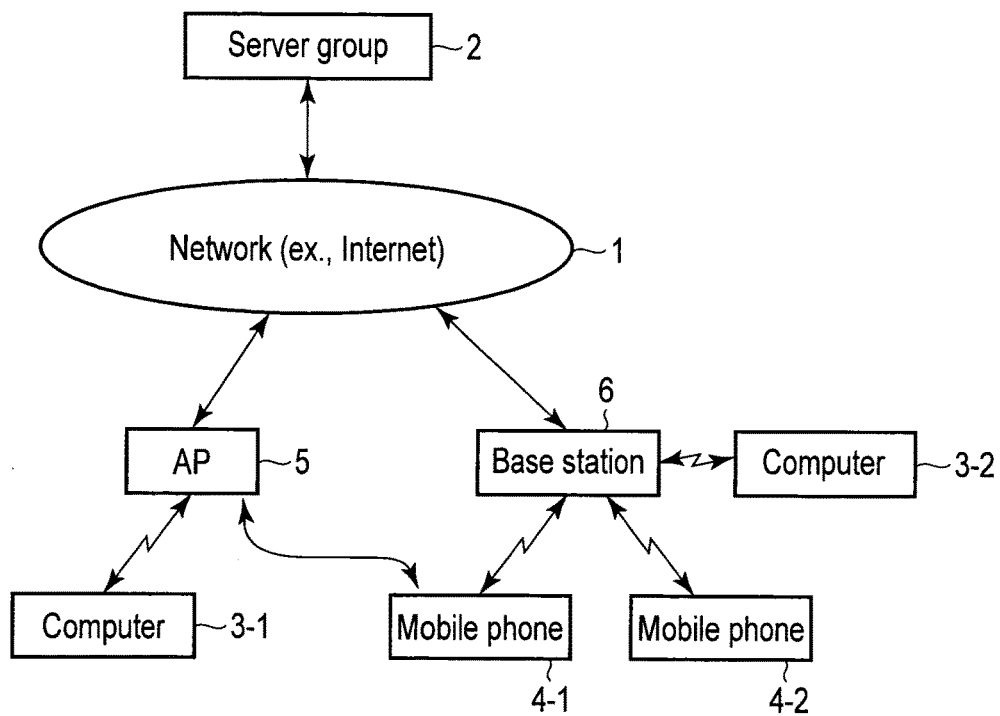
FIG. 1 is a view for explaining an environment in which a server group 2, computers 3-1 and 3-2 and mobiles phones 4-1 and 4-2 for realizing a ranking list display method in a game system according to an embodiment of the invention are used.

FIG. 1 is a view for explaining an environment in which a server group 2, computers 3-1 and 3-2 and mobiles phones 4-1 and 4-2 for realizing the ranking list display method in the game system according to the embodiment of the invention are used.

As illustrated in FIG. 1, the server group 2 for executing a main process for realizing the ranking list display method in the game system according to the embodiment of the invention, and a plurality of computers 3-1 and 3-2 and mobile phones 4-1 and 4-2, which are used by users who play in the game system according to the embodiment, are connected to a network 1 such as the Internet via an access point 5 or a base station 6.

The server group 2 may be realized by a single computer, or may be composed of a plurality of computers, such as a Web server, a process server and a database server, in association with respective functions. In this embodiment of the invention, the configuration of the server group 2 is not specified.

The computers 3-1 and 3-2 include a mobile computer, a laptop computer, or a tablet terminal, as well as an ordinary desktop computer.

The mobile phones 4-1 and 4-2 include a smartphone or a feature phone, and are mobile phones which operate on OSs such as Android (trademark) or iOS (trademark).

Figure 2:
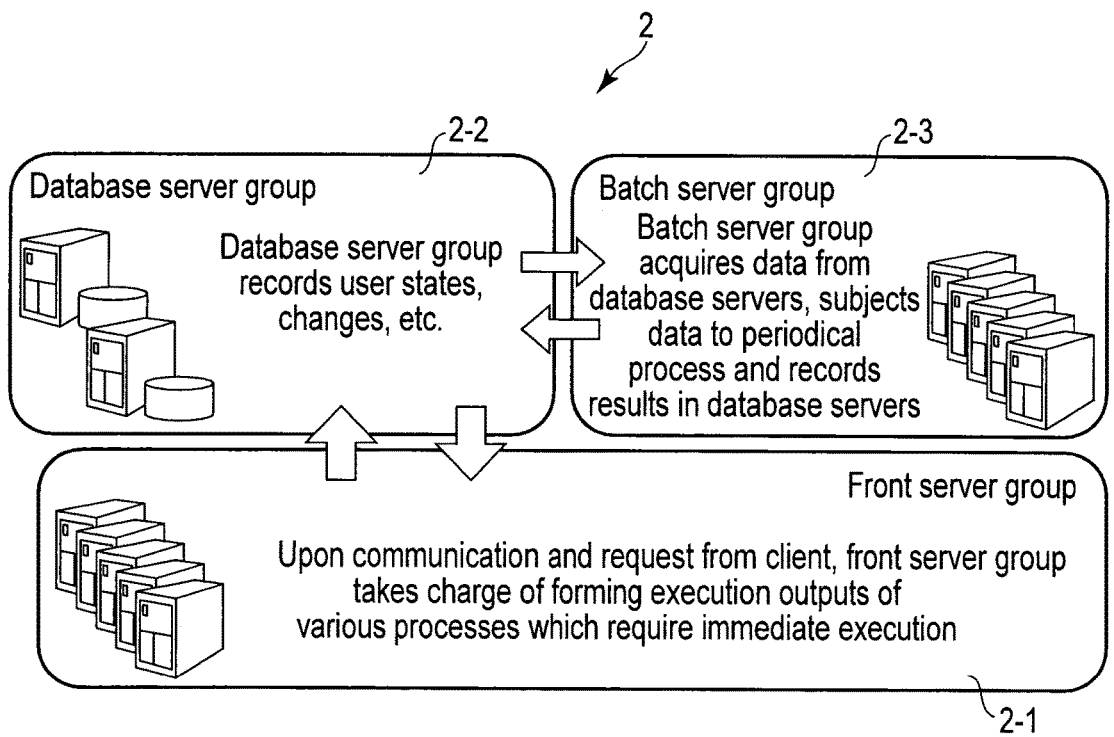
FIG. 2 is a view illustrating an example of the structure of the server group 2 in the embodiment of invention.

FIG. 2 is a view illustrating an example of the structure of the server group 2 in the embodiment of invention.

As illustrated in FIG. 2, for example, the server group 2 is composed of a front server group 2-1, a database server group 2-2 and a batch server group 2-3.

The front server group 2-1 is in charge of forming execution outputs of various processes which are immediately executable upon receiving a communication request with a client. The front server group 201 is, for instance, a Web server.

The database server group 2-2 is a process server which executes, for example, a core process of a social network service process, as well as the ranking list display method in the game system according to the embodiment.

The batch server group 2-3 periodically acquires data from the database server group 2-2, executes a periodic process on the data, and records the result in the database server group 2-2.

Figure 3:
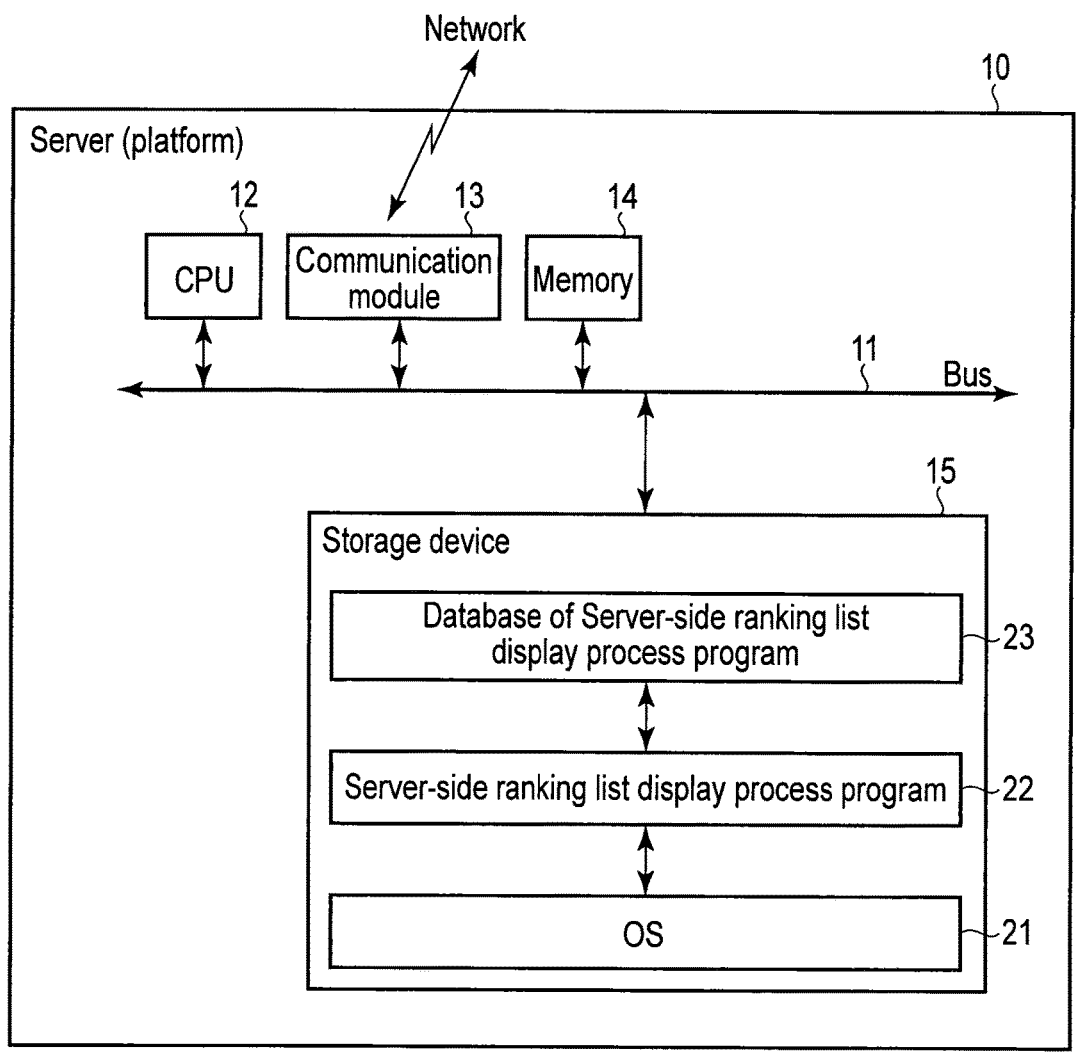
FIG. 3 is a view illustrating the configuration of a server 10 which executes an operation for realizing the ranking list display method in the game system according to the embodiment of the invention.

In the present embodiment, for the purpose of simple description, a description is given of the case in which an operation is performed on a single server 10 (platform) shown in FIG. 3. However, needless to say, the configuration of the server is not limited to this example.

FIG. 3 is a view illustrating the configuration of the server 10 which executes an operation for realizing the ranking list display method in the game system according to the embodiment of the invention.

As illustrated in FIG. 3, in the server 10, a CPU 12, a communication module 13, a memory 14 and a storage device 15 are connected to a bus 11.

The CPU 12 cooperates with a server-side ranking list display process program 22 relating to the embodiment of the invention, which is stored in the storage device 15, and the CPU 12 executes the ranking list display method in the game system according to the embodiment and also executes overall control of the server 10.

The communication module 13 executes control of communication with an external device such as a client via the network 1.

The memory 14 is used as, for example, a work area which is needed at a time of executing the server-side ranking list display process program 22.

The storage device 15 stores programs and data which are necessary for an object display process, and is, for example, a large-capacity storage device such as a hard disk drive (HDD), an optical disc drive, a DVD, or an MO. The storage device 15 stores an OS (operating system) 21, the server-side ranking list display process program 22, and a database 23 of the server-side ranking list display process program 22.

The OS 21 is a program for realizing basic functions of the server 10.

The server-side ranking list display process program 22 is a program for realizing the ranking list display method in the game system according to the embodiment of the invention. In the meantime, the ranking list display method in the game system of the embodiment is executed mainly by the server-side ranking list display process program 22, and display-related processes are executed on the client side. However, the process execution is not limited to this example, and a part or all of the ranking list display process, which is executed on the server side, may be executed on the client side.

The database 23 of the server-side ranking list display process program 22 stores various data which are used in the ranking list display method in the game system of the embodiment which is realized by the server-side ranking list display process program 22.

FIG. 4 is a view illustrating the configuration of the mobile phone (smartphone) 4 (4-1, 4-2) in the embodiment of the invention.

As illustrated in FIG. 4, a CPU 32, a wireless communication module 33, a memory 34, an electronic compass 35, a camera 36, a storage device 37, a touch panel sensor 38 and a display controller 39 are connected to a bus 31.

The CPU 32 cooperates with a client-side ranking list display process program 37-3 relating to the embodiment of the invention, which is stored in the storage device 37, and the CPU 32 executes the ranking list display method in the game system according to the embodiment and also executes overall control of the mobile phone 4.

The wireless communication module 33 executes control of communication with an external device such as a server via the network 1. In addition, the wireless communication module 33 includes wireless communication functions of wireless LAN, Bluetooth (trademark) and Wi-Fi (trademark).

The memory 34 is used as, for example, a work area which is needed at a time of executing the client-side ranking list display process program 37-3.

The electronic compass 35 includes a geomagnetic sensor, and measures an azimuth direction.

The camera 36 includes an image-capturing function, and stores a captured image in the storage device 37.

The storage device 37 stores programs and data which are necessary for a client-side ranking list display process relating to the embodiment, and is a storage device such as a flash memory.

The storage device 37 stores an OS (operating system) 37-1, a database 37-2 of the client-side ranking list display process program 37-3, and the client-side ranking list display process program 37-3.

The OS 37-1 is a program for realizing basic functions of the mobile phones 4.

The database 37-2 manages data which are used in the ranking list display method in the client-side game system by the client-side ranking list display process program 37-3.

In the present embodiment, it is presupposed that only those of the information pieces stored in the server-side database 23, which relate to the user of the mobile phone 4, are stored in the database 37-2. However, the database 37-2 may store only a part of these information pieces, or may store other information.

The client-side ranking list display process program 37-3 is a program which controls a client-side process of the ranking list display method in the game system according to the embodiment.

The touch panel sensor 38 is a sensor which detects a user action on a touch panel of a display module 40 of the mobile phone 4.

The display controller 39 executes display control of the display module 40.

FIG. 5 is a view illustrating ranking data which is stored in the database 23 of the server-side ranking list display process program 22. As illustrated in FIG. 5, ranking data 41 includes rank data 42, a user name 43, a user ID 44, ranking detailed data 45, and a pointer setup target user ID 46, and these are mutually associated and stored.

The ranking detailed data 45 is detailed data of the user, such as points in a game.

The pointer setup target user ID 46 designates a user who becomes a target of a pointer which is displayed on the ranking list, and is stored in association with the user ID 44. As regards the designation of the pointer setup target user ID 46, a user ID of a user himself/herself, a rival or a friend in the game can be designated. In addition, not only the user ID of the user himself/herself, but also a plurality of user IDs can be designated. The rank of the user ID 44, which is managed by the pointer setup target user ID 46, is indicated by a pointer (icon).

Figure 6:
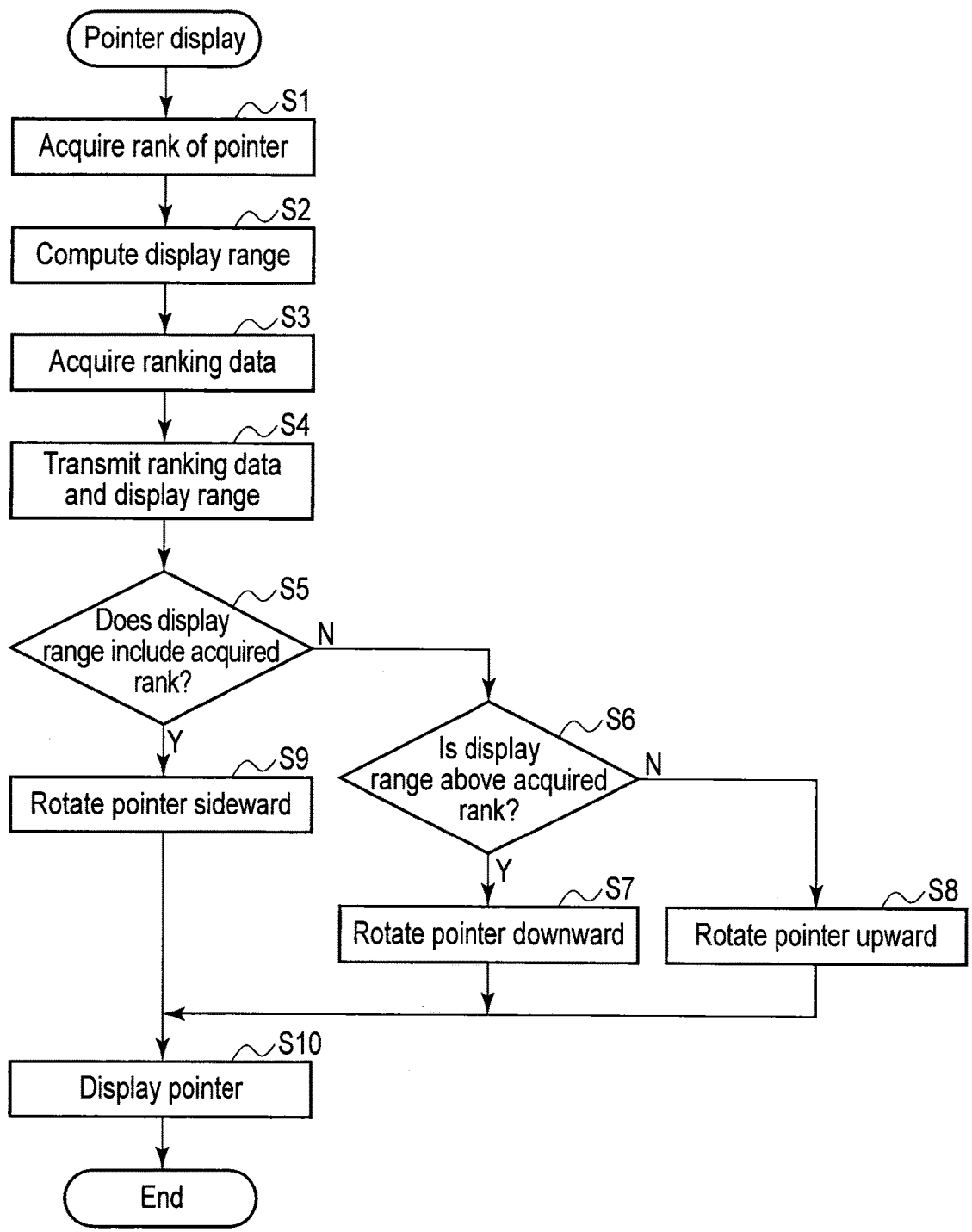
FIG. 6 is a flowchart for describing the ranking list display method in the game system according to the embodiment of the invention.

Next, referring to a flowchart of FIG. 6, a description is given of the ranking list display method in the game system according to the embodiment of the invention.

As has been described above, the ranking list display method in the game system of the embodiment is executed mainly by the server-side ranking list display process program 22, and display-related processes are executed on the client side. However, the process execution is not limited to this example, and a part or all of the ranking list display process, which is executed on the server side, may be executed on the client side. Accordingly, in the embodiment described below, even in the case where a process is described as a server-side process, this process may be executed on the client side. In addition, even in the case where a process is described as a client-side process, this process may be executed on the server side.

To begin with, if a display request for a ranking list has been issued from the mobile phone 4, the server 10 searches for a pointer setup target user ID 46 which is managed by a user ID 44 which has issued the display request for the ranking list, acquires the rank data 42 of the user ID 44 associated with the ranking data 41 by using the searched pointer setup target user ID 46 as the key, and sends the acquired rank data 42 to the mobile phone 4. Thereby, the mobile phone 4 acquires the rank data 42 of the searched pointer setup target user ID 46 (S1).

Next, a display range is computed in the server 10 (S2). In the computation of the display range, for example, the display range is determined based on the rank data 42 of the ranking data 41, such as the first rank to the ninth rank in the ranking list, but the computation of the display range is not limited to this example. In addition, the display range may be computed based on screen scroll on the mobile phone 4.

Subsequently, the ranking data 41 is acquired (S3). In the meantime, as regards the acquisition of the ranking data 41, all the ranking data 41 may be acquired, or a part of the ranking data 41 may be acquired.

Thereafter, the ranking data 41 and the display range computed in S2 are transmitted to the mobile phone 4. Thereby, the ranking data 41 of the computed display range is displayed on the mobile phone 4.

Next, in the server 10, it is determined whether the display range computed in S2 includes the rank indicated by the rank data 42 acquired in S1 (S5). If it is determined in S5 that the display range does not include the rank indicated by the rank data 42 acquired in S1, it is determined whether the display range is above the rank indicated by the ranking data 42 acquired in S1 (S6).

If it is determined in S6 that the display range is not above the rank indicated by the ranking data 42 acquired in S1, the pointer is rotated upward in the mobile phone 4 (S8) and the pointer is displayed (S10). If it is determined in S6 that the display range is above the rank indicated by the ranking data 42 acquired in S1, the pointer is rotated downward in the mobile phone 4 (S7) and the pointer is displayed (S10).

On the other hand, if it is determined in S5 that the display range includes the rank indicated by the rank data 42 acquired in S1, the pointer is rotated sideward (S9), and the pointer is displayed (S10).

Figure 7:
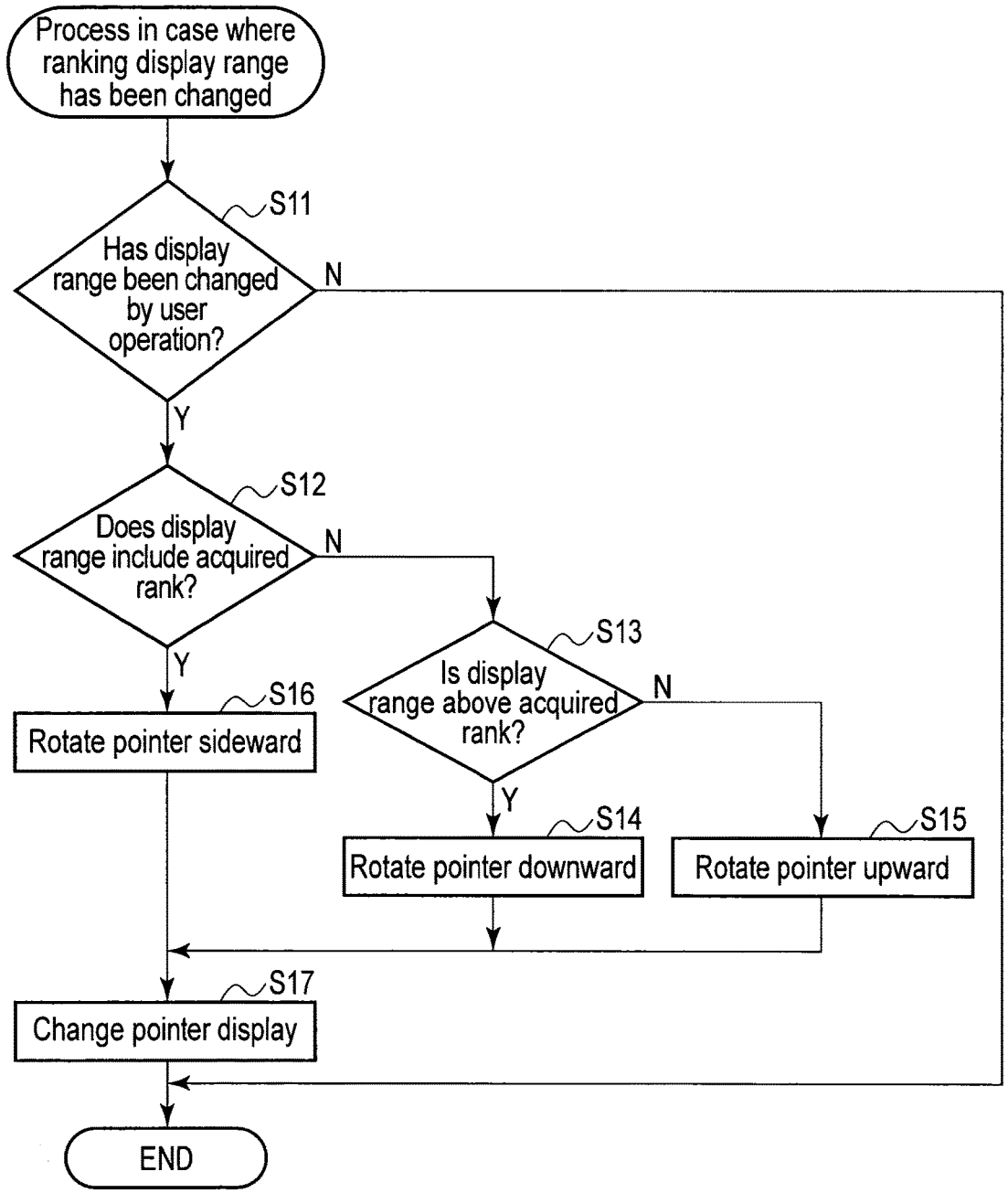
FIG. 7 is a flowchart for describing the ranking list display method in a case where a ranking display range in the game system according to the embodiment of the invention has been changed.

FIG. 7 is a flowchart for describing the ranking list display method in a case where a ranking display range has been changed.

To start with, it is determined whether the display range has been changed by a user operation (e.g. scroll, slide) (S11). When it has been determined that the display range has been changed, it is determined whether display range computed in S2 includes the rank indicated by the rank data 42 acquired in S1 (S12). If it is determined in S12 that the display range does not include the rank indicated by the rank data 42 acquired in S1, it is determined whether the display range is above the rank indicated by the ranking data 42 acquired in S1 (S13).

If it is determined in S13 that the display range is not above the rank indicated by the ranking data 42 acquired in S1, the pointer is rotated upward in the mobile phone 4 (S15)

and the pointer display is changed (S17). If it is determined in S13 that the display range is above the rank indicated by the ranking data 42 acquired in S1, the pointer is rotated downward in the mobile phone 4 (S14) and the pointer display is changed (S17).

On the other hand, if it is determined in S12 that the display range includes the rank indicated by the rank data 42 acquired in S1, the pointer is rotated sideward (S16), and the pointer display is changed (S17).

In the meantime, when there are a plurality of pointer setup target user IDs 46, the process from S5 to S10 and the process from S12 to S17 are executed with respect to each of the pointer setup target user IDs 46. Specifically, the pointer is displayed in association with each of the pointer setup target user IDs 46.

Figure 8:
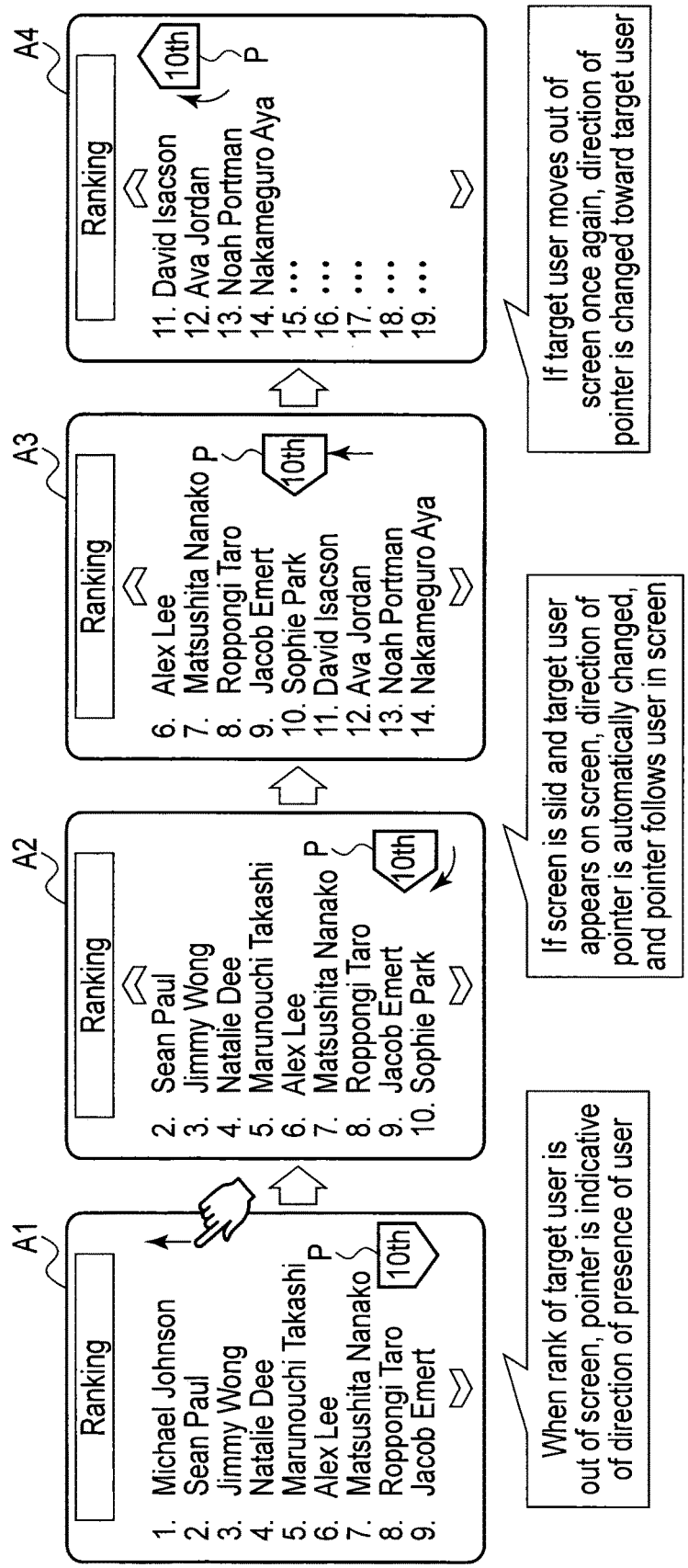
FIG. 8 is a view illustrating a pointer of a pointer setup target user (user himself(herself)/friend/arbitrary designated user) on the ranking displayed on the mobile phone 4.

FIG. 8 is a view illustrating a pointer of a pointer setup target user (user himself(herself)/friend/arbitrary designated user) on the ranking displayed on the mobile phone 4.

In FIG. 8, the case in which the setup target user of a pointer P is a 10th rank is described by way of example.

A screen A1 displays a first rank to a ninth rank in the ranking, and the setup target user of the pointer P is the 10th rank, and thus the user name is not displayed. Accordingly, a downward pointer P indicative of a direction of the presence of the user is displayed. In the pointer P, the rank of the setup target user of the pointer P is displayed.

A screen A2 shows a case in which the user has slid the screen A1 upward, and a second rank to the 10th rank are displayed. On this screen, since the pointer setup target user is displayed, the pointer P is rotated in a parallel direction and is displayed. In this case, the pointer P is displayed at a position alongside the pointer setup target user.

A screen A3 shows a case in which the user has slid the screen A2 upward, and a 6th rank to a 14th rank are displayed. As illustrated in FIG. 8, the pointer P is displayed such that the pointer P moves in a manner to follow the pointer setup target user.

A screen A4 shows a case in which the user has slid the screen A3 upward, and an 11th rank to a 19th rank are displayed. On the screen A4, since the setup target user of the pointer P is out of the screen once again, the pointer P is rotated upward and displayed.

Figure 9:
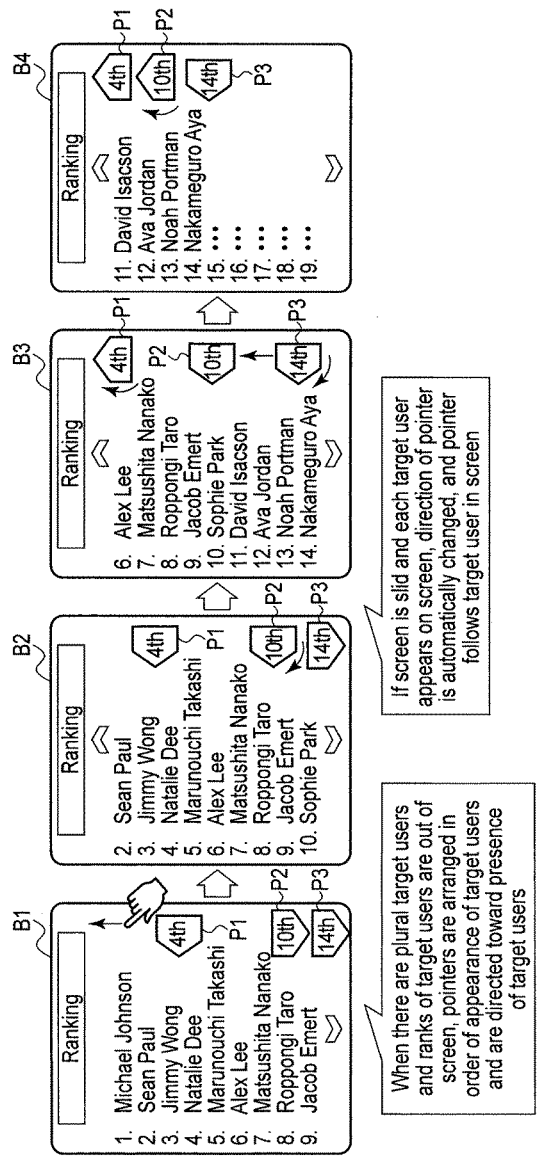
FIG. 9 is a view illustrating a case in which there are a plurality of pointers of pointer setup target users (user himself(herself)/friend/arbitrary designated user) on the ranking displayed on the mobile phone 4.

FIG. 9 is a view illustrating a case in which there are a plurality of pointers of pointer setup target users (user himself(herself)/friend/arbitrary designated user) on the ranking displayed on the mobile phone 4.

In FIG. 9, the case in which the setup target users of pointers P1 to P3 are a 4th rank, a 10th rank and a 14th rank is described by way of example.

A screen B1 displays a first rank to a 9th rank in the ranking, and the setup target users of the pointers P2 and P3 are the 10th rank and 14th rank, and thus the user names thereof are not displayed. Accordingly, downward pointers P2 and P3 indicative of the direction of the presence of the users is displayed. In the pointer P, the rank of the setup target user of the pointer P is displayed. On the other hand, since the setup target user of the pointer P1 is the 4th rank and is displayed on the screen B1, the pointer P1 is rotated in a parallel direction and is displayed. In this case, the pointer PI is displayed at a position alongside the pointer setup target user.

A screen B2 shows a case in which the user has slid the screen B1 upward, and the second rank to the 10th rank are displayed. On this screen, since the pointer setup target user of the pointer P2 is displayed on the screen, the pointer P2 is rotated in a parallel direction and is displayed. In this case, the pointer P2 is displayed at a position alongside the pointer setup target user.

A screen B3 shows a case in which the user has slid the screen B2 upward, and the sixth rank to 14th rank are displayed. As illustrated in FIG. 9, the pointer P2 is displayed such that the pointer P2 moves in a manner to follow the pointer setup target user. In addition, on the screen B3, since the setup target user of the pointer P1 is out of the screen, the pointer P1 is rotated upward and displayed. On the other hand, since the pointer setup target user of the pointer P3 is displayed on the screen, the pointer P3 is rotated in the parallel direction and is displayed.

A screen B4 shows a case in which the user has slid the screen B3 upward, and the 11th rank to 19th rank are displayed. On the screen B4, since the setup target user of the pointer P2 is out of the screen once again, the pointer P2 is rotated upward and displayed.

Next, referring to a flowchart of FIG. 10, a description is given of a transition of the screen in a case where a pointer displayed on the screen has been tapped.

To start with, it is determined whether a pointer select operation (tap) has been executed (S21). If it is determined in S21 that the pointer select operation has been executed, ranking data 41 including the rank data 42 of the pointer setup target user ID 46 is acquired (S22).

Next, the pointer P is rotated sideward (S23), the ranking display range is changed such that the rank of pointer setup target user is displayed at the center (S24), and the process is terminated.

Thereby, the ranking information of the pointer setup target user ID 46 is displayed.

FIG. 11 is a view illustrating a case in which when the pointer P of the 14th rank displayed on a screen C1 has been tapped, the screen C1 transitions to a screen C2 which displays the 14th rank of the setup target user at center. In the above description, the case of executing a "tap" operation has been described, but the tap may be replaced with other operations. In addition, the transition of the screen includes scroll, jump, etc., and the method of the transition is not specified.

In the above-described example, when the pointer is tapped, the rank of the pointer setup target user 46 is displayed at the center. However, by rotating the pointer, a transition may be made to the screen which displays the rank of the pointer setup target user 46 at the center. For example, by rotating a downward or upward pointer sideward by a user operation, a transition may be made to the screen which displays the rank of the pointer setup target user 46 at the center.

Next, referring to a flowchart of FIG. 12, a description is given of a method of referring to detailed information from a pointer indicative of the setup target user on the ranking.

To start with, it is determined whether a pointer select operation (detail display) has been executed (S31).

In this case, the pointer select operation (detail display) is, for example, a double-tap or a long-press of pointer, but is not limited to such examples.

If it is determined in S31 that the pointer select operation (detail display) has been executed, ranking data 41 including the rank data 42 of the pointer setup target user ID 46 is acquired (S32). Then, based on the acquired ranking data, a detailed information screen is displayed (S33).

Figure 13A:
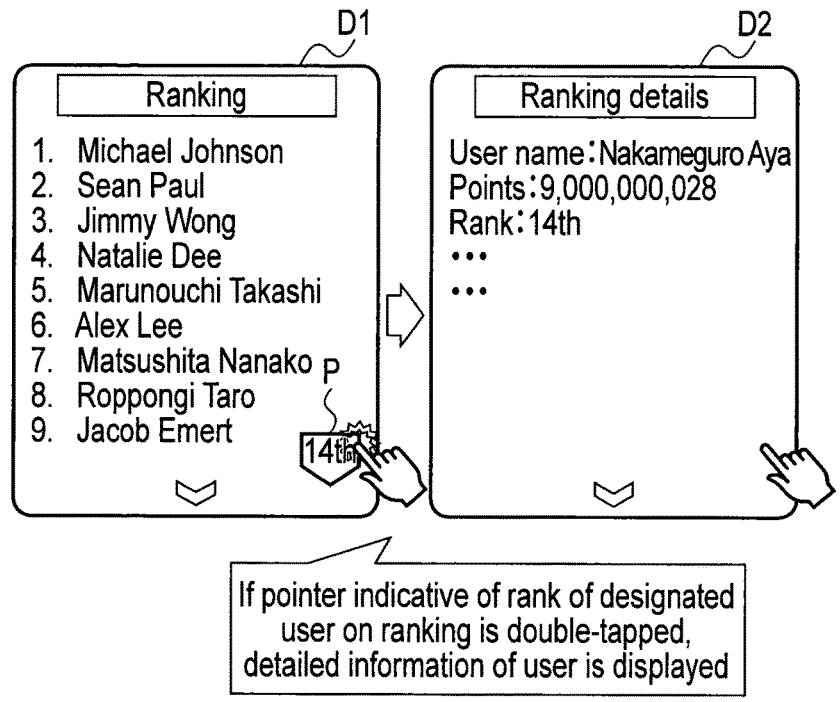
FIG. 13A is a view illustrating a detail display screen which is displayed when a pointer select operation (double-tap) has been executed.
Figure 13B:
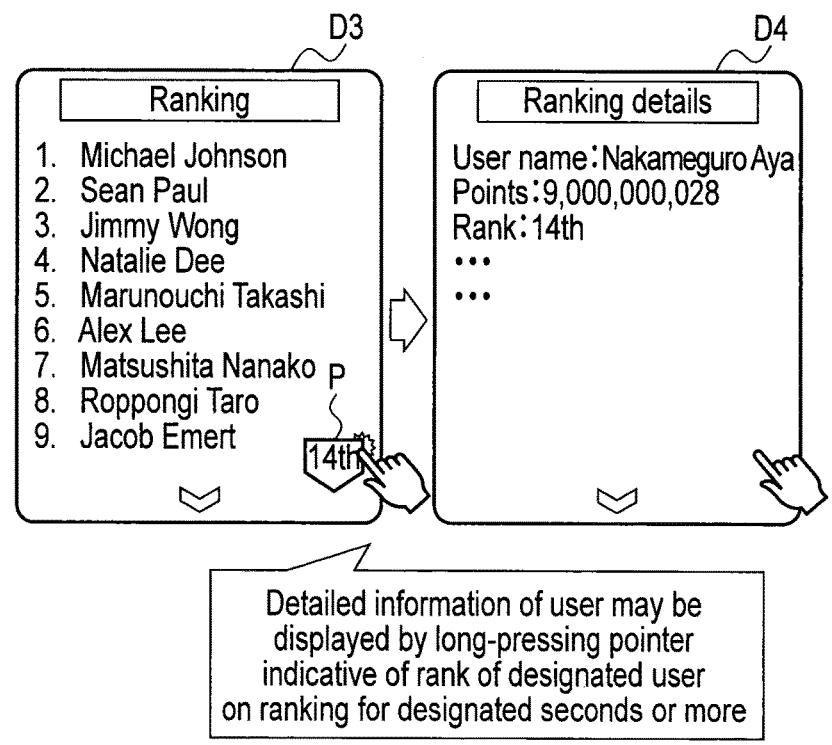
FIG. 13B is a view illustrating a detail display screen which is displayed when a pointer select operation (long-press) has been executed.

FIG. 13A is a view illustrating a detail display screen which is displayed when a pointer select operation (double-tap) has been executed. If a pointer select operation is executed on a pointer P displayed on a screen D1, the detailed information of the pointer setup target user of the pointer P is displayed, as shown on a screen D2. In another example, as illustrated in FIG. 13B, if a pointer select operation (long-press) is executed on a pointer P displayed on a screen D3, the detailed information of the pointer setup target user of the pointer P is displayed, as shown on a screen D4.

Figure 14:
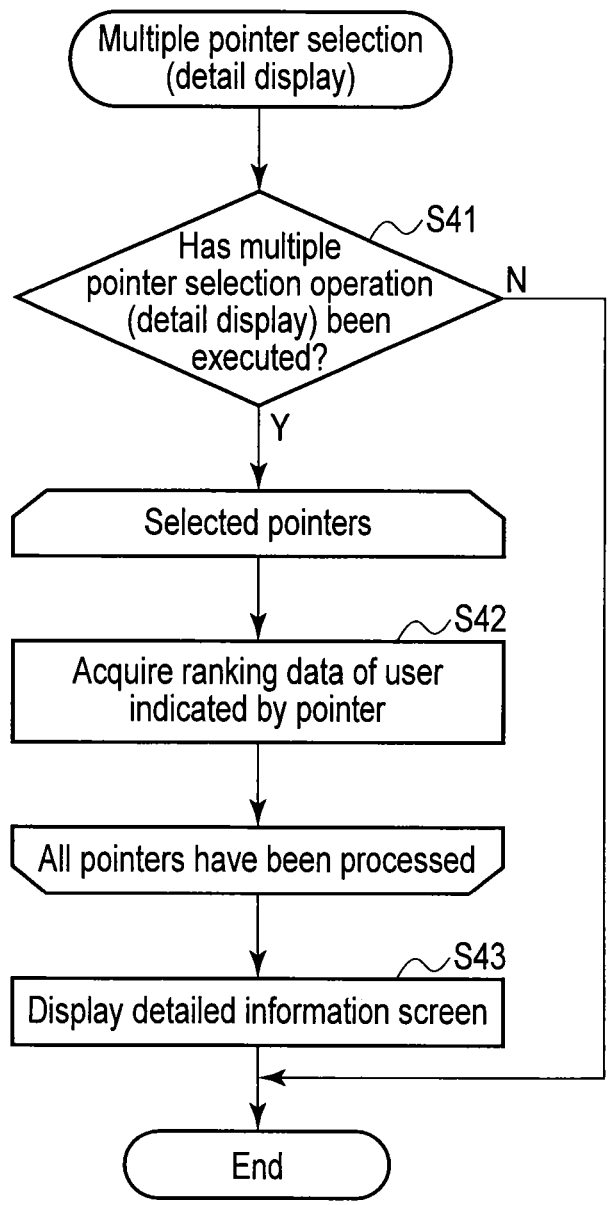
FIG. 14 is a flowchart for describing a method of referring to a plurality of detailed information pieces from a plurality of pointers indicative of a plurality of setup target users on the ranking.

Next, referring to a flowchart of FIG. 14, a description is given of a method of referring to a plurality of detailed information pieces from a plurality of pointers indicative of a plurality of setup target users on the ranking.

To start with, it is determined whether a multiple pointer select operation (detail display) has been executed (S41). In this case, the multiple pointer select operation (detail display) is, for example, a simultaneous tap of plural pointers on the ranking, but is not limited to this example.

If it is determined in S41 that the multiple pointer select operation (detail display) has been executed, ranking data 41 of the pointer setup target user IDs 46 is acquired (S42). The process of S42 is executed for all of the pointer setup target user IDs 46 (all of the pointers). Then, based on the acquired ranking data, a detailed information screen is displayed (S43).

FIG. 15 is a view illustrating a detail display screen which is displayed when a multiple pointer select operation (detail display) has been executed. If a multiple pointer select operation (simultaneous multiple tap) is executed on pointers P1 and P2 displayed on a screen E1, the detailed information pieces of the pointer setup target users 46 of the pointers P1 and P2 are displayed, as shown on a screen E2.

Figure 16:
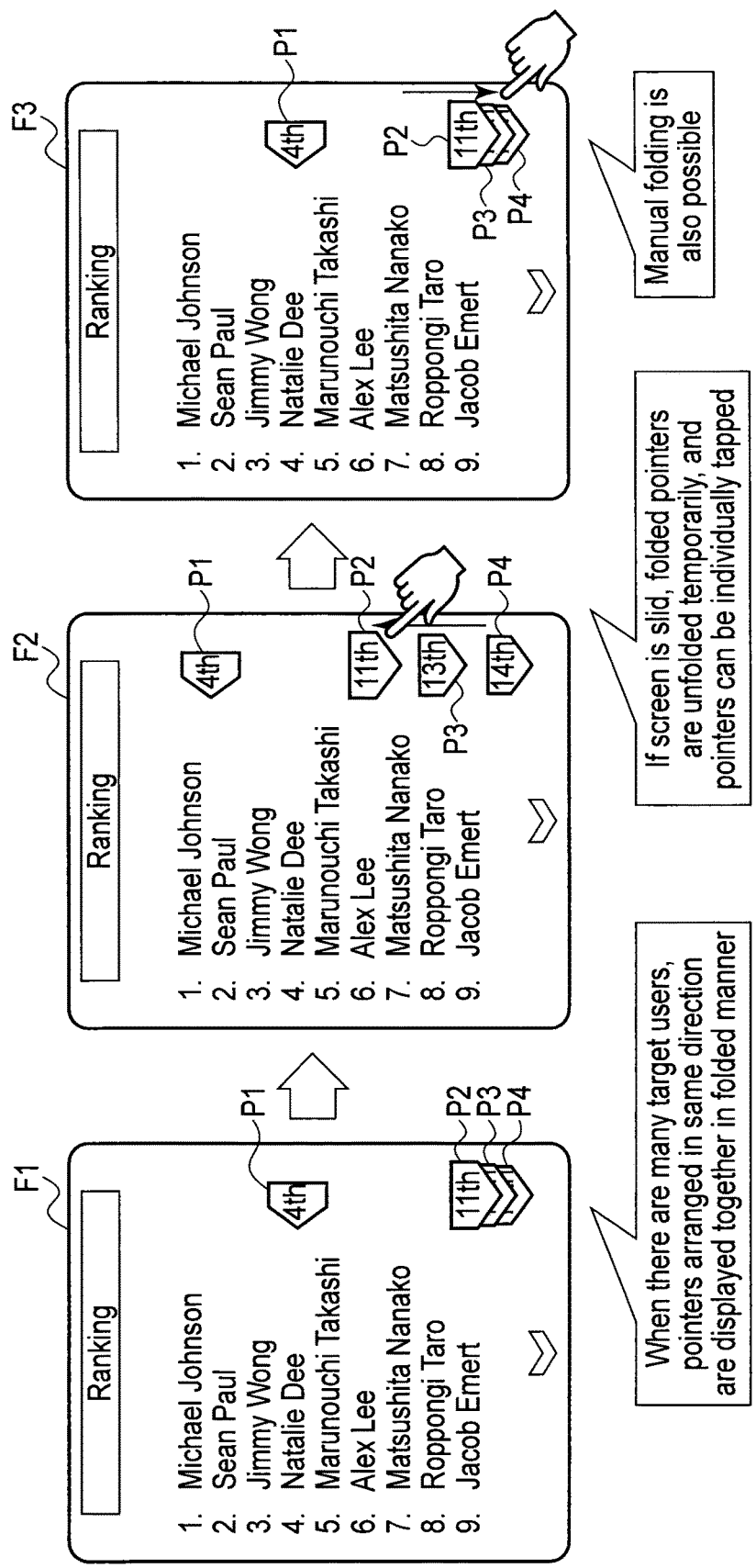
FIG. 16 is a view illustrating an example of a method of displaying pointers in the embodiment of the invention.

FIG. 16 is a view illustrating an example of a pointer display method in the embodiment of the invention.

As illustrated in FIG. 16, when there are many target users, the pointers, which are arranged in the same direction, are displayed together in a folded manner. Specifically, when the number of pointer setup target user IDs 46 exceeds a predetermined number, the pointers in same direction are displayed together in the folded manner.

A screen F1 in FIG. 16 illustrates an example in which pointers P2 to P4 in the same direction are displayed together in the folded manner. A screen F2 illustrates an example in which the user has slid the pointers P2 to P4, and the pointers P2 to P4, which were temporarily displayed together in the folded manner, have been unfolded and displayed. Thereby, the unfolded pointers P2 to P4 can be individually selected. A screen F3 illustrates an example in which the user has slid the unfolded pointers P2 to P4, and the pointers P2 to P4 have been restored to the folded state.

In the meantime, in the above-described embodiment, the case in which all pointers of pointer setup target users are displayed has been described. Alternatively, only a pointer of a pointer setup target user in a predetermined range of the ranking of the user himself/herself may be displayed, or none of the pointers of the pointer setup target users may be displayed.

The shape of the pointer is not limited to the illustrated shape. For example, the pointer may have the shape of a finger, or may be a sign of inequality. It should suffice if the pointer is representative of the direction of the rank of the user of the pointer setup target user ID 46.

In addition, the case has been illustrated that rank is displayed within the pointer. However, the information displayed within the pointer is not limited to this example, and a user name, for instance, may be displayed within the pointer. Besides, the color or shape of the pointer may be varied in accordance with the kind of user.

Therefore, according to the present embodiment, even in the case of a user who is not displayed on the ranking list screen, the ranking of the user who is the ranking confirmation target can easily be confirmed by the direction of the pointer of the user.

Furthermore, the direction of the pointer is changed in accordance with the transition of the screen of ranking list. Thus, even if the ranking list screen is transitioned, the ranking of the user of the ranking confirmation target can easily be confirmed.

In addition, by selecting a pointer, a transition can be made to the ranking list display screen of the user indicated by the pointer. Thus, the ranking of the user of the confirmation target can easily be confirmed.

By selecting a pointer (detail display), a transition can be made to the screen displaying the detailed information of the user indicated by the pointer. Thus, without making a transition to the ranking list display screen on which the user indicated by the pointer is displayed, the ranking confirmation of the user of ranking confirmation target can easily be executed. In addition, by selecting plural pointers (detail display), a transition can be made to the screen displaying the detailed information of plural users indicated by the pointers. Thus, the ranking confirmation of the users of the ranking confirmation targets can easily be executed.

Furthermore, according to the present embodiment, pointers in the same direction, which are displayed on ranking list display screen, can be displayed together in an unfoldable/foldable manner. Thus, even in the case where there are many users of ranking confirmation targets, ranking confirmation can easily be made.

While certain embodiments have been described, these embodiments have been presented by way of example only, and are not intended to limit the scope of the inventions. The novel embodiments described herein may be embodied in a variety of other forms; furthermore, various omissions, substitutions and changes may be made without departing from the spirit of the inventions. The accompanying claims and their equivalents are intended to cover such forms or modifications as would fall within the scope and spirit of the inventions.

The methods, which have been described in connection with the present embodiment, may be stored as a computer-executable program in a recording medium such as a magnetic disk (e.g. floppy (trademark) disk, hard disk), an optical disk (e.g. CD-ROM, DVD, MO) or a semiconductor memory (e.g., ROM, RAM, flash memory), or may be transmitted via communication media and distributed. The program stored in the recording medium includes a setup program which configures software means (including not only an execution program, but also a table or data structure) in the computer. The computer, which realizes the present apparatus, reads the program that is stored in the recording medium or, in some cases, constructs the software means by the setup program, and executes the above-described process by the operation being controlled by software means. The recording medium, in the context of the specification, includes not only a medium for distribution, but also a storage medium, such as a magnetic disk or a semiconductor memory, which is provided in the computer or in a device that is connected via a network.

What is claimed is:

1. A method performed by an electronic device, the method comprising:

transmitting, via a communication interface of the electronic device, a display request for a ranking list to a computer, the display request including identification information corresponding to a user who is a ranking confirmation target;

controlling, by circuitry of the electronic device, the communication interface to receive, in response to the display request, a position in the ranking list of the user in relation to a display range of the ranking list from the computer, wherein the position is identified by the computer based on ranking data stored in the computer;

displaying, by the circuitry, a pointer that corresponds to the position received by the communication interface;

determining, by the circuitry, based on a user input at the electronic device, whether the display range is changed;

determining, by the circuitry, when it is determined that the display range is changed, a direction of the pointer based on the changed display range and the position received by the communication interface;

determining, by the circuitry, that a user input is received at the pointer displayed by the electronic device;

controlling, by the circuitry, the communication interface to receive the ranking data including another user based on the user input received at the pointer; and display, by the circuitry, the display range of the ranking list including a rank of the another user based on the received ranking data.

2. An electronic device comprising:
a communication interface configured to transmit a display request for a ranking list to a computer, the display request including identification information corresponding to a user who is a ranking confirmation target;
circuitry configured to
control the communication interface to receive, in response to the display request, a position in the ranking list of the user in relation to a display range of the ranking list from the computer, wherein the position is identified by the computer based on ranking data stored in the computer;
display a pointer that corresponds to the position received by the communication interface;
determine, based on a user input at the electronic device, whether the display range is changed;
determine, when it is determined that the display range is changed, a direction of the pointer based on the changed display range and the position received by the communication interface;
determine that a user input is received at the pointer displayed by the electronic device;
control the communication interface to receive ranking data including another user based on the user input received at the pointer; and
display the display range of the ranking list including a rank of the another user based on the received ranking data.

3. The electronic device of claim 2, wherein
the pointer, which corresponds to the received position in the ranking list of the user who is the ranking confirmation target, is a first pointer which indicates that the user who is the ranking confirmation target is within the display range of the ranking list, when the position in the ranking list of the user is within the display range of the ranking list which is currently displayed, the pointer, which corresponds to the received position in the ranking list of the user who is the ranking confirmation target, is a second pointer which indicates that the user who is the ranking confirmation target is above the display range of the ranking list, when the position in the ranking list of the user is above the display range of the ranking list which is currently displayed, and the pointer, which corresponds to the received position in the ranking list of the user who is the ranking confirmation target, is a third pointer which indicates that the user who is the ranking confirmation target is below the display range of the ranking list, when the position in the ranking list of the user is below the display range of the ranking list which is currently displayed.

4. The electronic device of claim 2, wherein
the circuitry is configured to display information of the user who is the ranking confirmation target when a predetermined user input to the pointer is accepted.

5. The electronic device of claim 2, wherein
there are a plurality of the pointers, and the circuitry is configured to display pointers of the plurality of pointers, which indicate the same direction of the identified positions in the ranking list of users who are ranking confirmation targets in relation to the display range, in a foldable and unfoldable manner.

6. The electronic device of claim 2, wherein
the electronic device is a client.

7. The electronic device of claim 2, further comprising:
a client including the circuitry and the communication interface configured to communicate with the computer over a network.

8. A non-transitory computer-readable medium including computer instructions, which when executed by an electronic device, cause the electronic device to:
transmit a display request for a ranking list to a computer, the display request including identification information corresponding to a user who is a ranking confirmation target;
control the communication interface to receive a position in the ranking list of the user in relation to a display range of the ranking list from the computer, in response to the display request, wherein the position is identified by the computer based on ranking data stored in the computer;
display a pointer, which corresponds to the position received by the communication interface;
determine, based on a user input at the electronic device, whether the display range is changed;
determine, when it is determined that the display range is changed, a direction of the pointer based on the changed display range and the position received by the communication interface;
determine that a user input is received at the pointer displayed by the electronic device;
control the communication interface to receive the ranking data including another user based on the user input received at the pointer; and
display the display range of the ranking list including a rank of the another user based on the received ranking data.

* * * * *

UNITED STATES PATENT AND TRADEMARK OFFICE
CERTIFICATE OF CORRECTION

Page 1 of 1

PATENT NO. : 9,737,816 B2
APPLICATION NO. : 15/386971
DATED : August 22, 2017
INVENTOR(S) : Maya Sawamura et al.

It is certified that error appears in the above-identified patent and that said Letters Patent is hereby corrected as shown below:

On the Title Page

Item (30), the Foreign Application Priority Data has been omitted. Item (30) should read:
--(30)    Foreign Application Priority Data
    Feb. 21, 2013    (JP)....................2013-031903--

Signed and Sealed this
First Day of May, 2018

Andrei Iancu
*Director of the United States Patent and Trademark Office*